Figure 1:
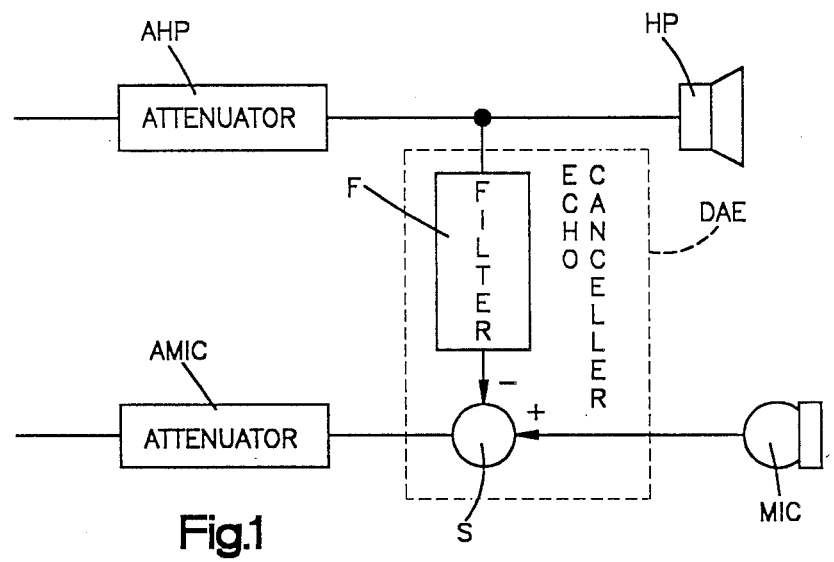

United States Patent [19]

Connan et al.

[11] Patent Number: 4,984,265
[45] Date of Patent: Jan. 8, 1991

[54] DEVICE FOR FORMING THE HANDS-FREE FUNCTION IN A TELEPHONE SET, ASSOCIATING THE GAIN SWITCHING AND ECHO SUPPRESSION FUNCTIONS

[76] Inventors: Jean-Louis Connan, 39 Residence de la Plage Tresmeur, 22560 Trebeurden; Jean-Yves Huiban, Ker Squivel Izellan Plou-Lech; Serge Pinaud, Kerbalanec Servel, both of 22300 Lannion, all of France

[21] Appl. No.: 432,332

[22] Filed: Nov. 3, 1989

Related U.S. Application Data

[63] Continuation of Ser. No. 159,176, Feb. 23, 1988, abandoned.

[30] Foreign Application Priority Data

Mar. 3, 1987 [FR] France ................................ 87 02850

[51] Int. Cl.⁵ .......................... H04M 9/08; H04M 3/40
[52] U.S. Cl. ...................................... 379/390; 379/387
[58] Field of Search ............... 379/390, 389, 387, 388, 379/406, 410, 409; 370/32.1

[56] References Cited

U.S. PATENT DOCUMENTS

| | | | |
|---|---|---|---|
| 3,499,999 | 3/1970 | Sondhi | 379/411 X |
| 3,588,385 | 6/1971 | Moye | 379/410 |
| 4,560,840 | 12/1985 | Hansen | 379/389 |
| 4,629,829 | 12/1986 | Puhl et al. | 379/390 |
| 4,712,235 | 12/1987 | Jones, Jr. | 379/410 |
| 4,747,132 | 5/1988 | Ibaraki et al. | 379/390 |

FOREIGN PATENT DOCUMENTS

| | | | |
|---|---|---|---|
| 0063638 | 10/1981 | European Pat. Off. | 379/410 |
| 0097732 | 5/1985 | Japan | 370/32.1 |
| 201525 | 9/1986 | Japan | 379/406 |
| 2125657 | 3/1984 | United Kingdom | |
| 8603912 | 7/1986 | World Int. Prop. O. | |

OTHER PUBLICATIONS

Patent Abstracts of Japan, vol. 9, No. 169 (E-328), 1982, 13.7.1985, JP-A-60 41 849 (Toshiba K.K.) 5.3.1985.

Patent Abstracts of Japan, vol. 7, No.123, (E-178), 1268, 27.5.1983, JP-A-58 42 345.

Primary Examiner—James L. Dwyer
Attorney, Agent, or Firm—Pearne, Gordon, McCoy & Granger

[57] ABSTRACT

Device for performing the "hands-free" function in a telephone set associating the gain switching and echo cancellation functions. This device is characterized in that it comprises a gain switch and an echo canceller, said switch having in the emission and reception channels a circuit for measuring the amplitude of the signals present on these channels, a checking circuit for determining the state of the telephone set (emission, reception, rest,) a calculating member controlled by the checking circuit, variable attenuators controlled by the calculating member, said calculating member evaluating, as a function of the relative amplitudes of the signals in emission and in reception, the echo cancellation performances obtained by the device and adjusting as a function thereof the variable attenuators in each channel, so that the overall attenuation in the loop always assumes the minimum value ensuring the stability of the system.

5 Claims, 3 Drawing Sheets

DEVICE FOR FORMING THE HANDS-FREE FUNCTION IN A TELEPHONE SET, ASSOCIATING THE GAIN SWITCHING AND ECHO SUPPRESSION FUNCTIONS

This is a continuation of application Ser. No. 07/159,176 filed on Feb. 23, 1988, now abandoned.

The present invention relates to a device making it possible to Perform the "hands-free" function in a telephone set. A telephone set is said to be "hands-free" when the loudspeaker and microphone are located in the same enclosure without the user having to take up the hand set. The acoustic coupling between the loudspeaker and the microphone causes Particular stability problems, whose solution constitutes the "hands-free" function.

The conventional, hitherto used process for performing this function was gain switching. This well known principle consists of alternately attenuating one or other of the transmission directions (emission or reception) as a function of the emitted and received signal levels. Amplifiers and attenuators are designed in such a way that the loop gain is constant and below the activation threshold (microphone or oscillating). This process can be performed in analog form or have digital subassemblies, as described in FR-A-No. 2 566 980. In these constructions, the obtaining of an adequate efficiency requires a large gain switching amplitude, which can be prejudicial for the user. Thus, the signal received by the microphone has the effect of placing the equipment in emission and therefore greatly attenuates the voice of the remote subscriber. In extreme cases, this principle can give the impression of half duplex operation, so that the starts and finishes of sentences are made unintelligible.

Another usable process is echo cancellation, which has hitherto been used in the field of transmissions. This process is based on the use of an auto-adaptive filter simulating the pulse response of the transducer-acoustic environment system. The realization of the "hands-free" function by this process imposes the use of a digital filter of significant length able to synthesize the pulse response.

The requisite performances can only be obtained in a calm environment following a relatively long convergence time and very sophisticated calculations are involved. Any modification to the environment leads to a deterioration in the performances of the cancellation device and becomes a source of instability. In practice, it would appear that for such a device to be usable, it is necessary to limit to the synthesis of short pulse responses (below 10 ms). This condition limits the echo cancellation performances and requires a combination with another member, such as a gain switch.

The object of the present invention is to perform the "hands-free" function by associating these two methods of echo cancellation and gain switching. Its originality is not based solely upon the association thereof, but more specifically on their mutual interaction.

The operation of an acoustic echo cancellation device is based on the use of an auto-adaptive filter, whose function is to reproduce the pulse response of the acoustic loop. However, this filter can only adapt its transfer function in the presence of a signal emitted by the loudspeaker. In the absence of this signal, any modification to the acoustic environment cannot be taken into account by the system, which leads to a reduction in the performance levels of the echo cancellation device and causes instability.

More specifically, the present invention consequently relates to a device performing the "hands-free" function in a telephone terminal comprising an echo cancellation means associated with a gain switch having on each of the channels a device for measuring the amplitude of the speech signals and a variable attenuator. Said attenuators are controlled by a calculating member which, as a function of the relative amplitudes of the speech signals present on each channel (emission and reception) and the gain of the echo cancellation device resulting therefrom, determines the optimum attenuation value to be inserted in each of the channels for ensuring stability and for bringing about maximum acoustic efficiency. The overall attenuation of the loop is rendered variable as a function of the performance of the echo canceller.

The invention is described in greater detail hereinafter relative to a non-limitative embodiment and the attached drawings, wherein show:

FIG. 1 diagrammatically a gain switch and echo cancellation device.

Figure 2:
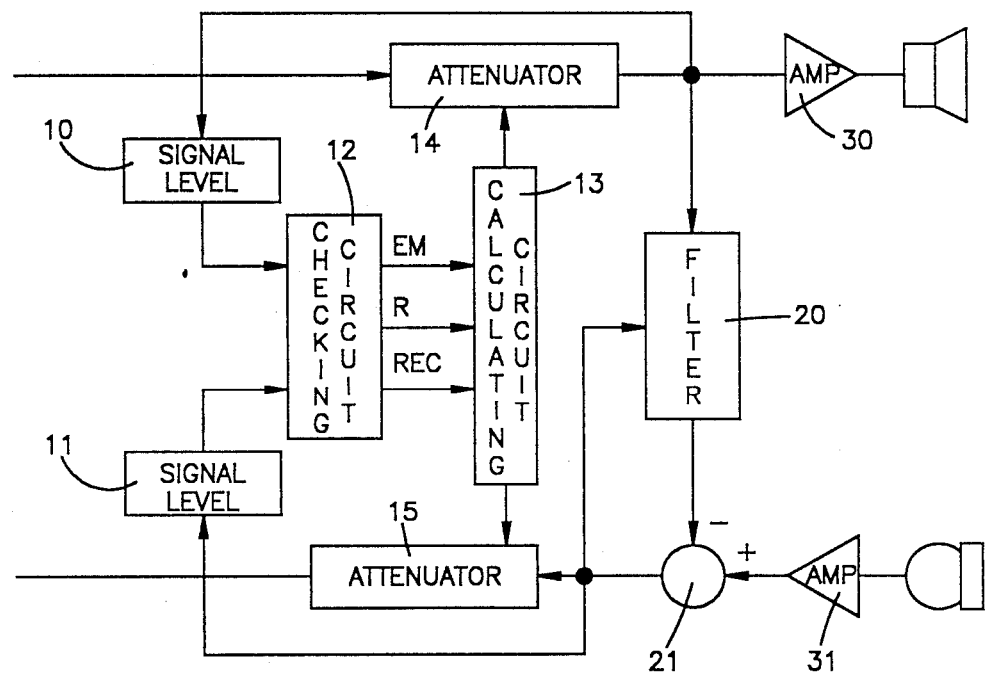

FIG. 2 a first embodiment of a device according to the invention.

Figure 3:
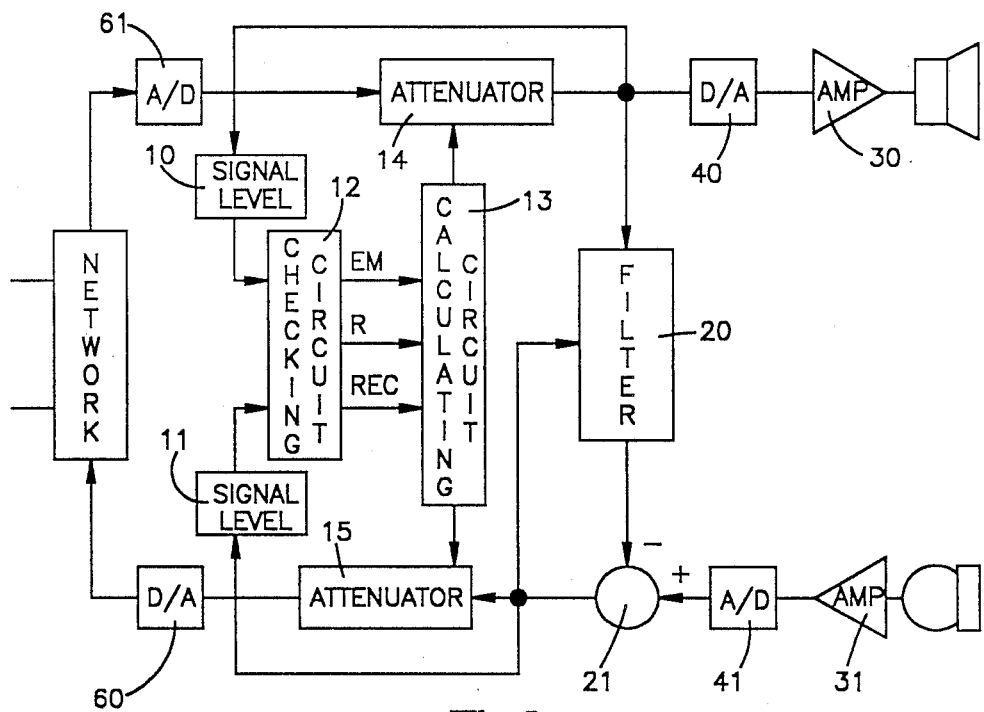

FIG. 3 a variant for use on an analog-type, two wire network.

Figures 4, 5:
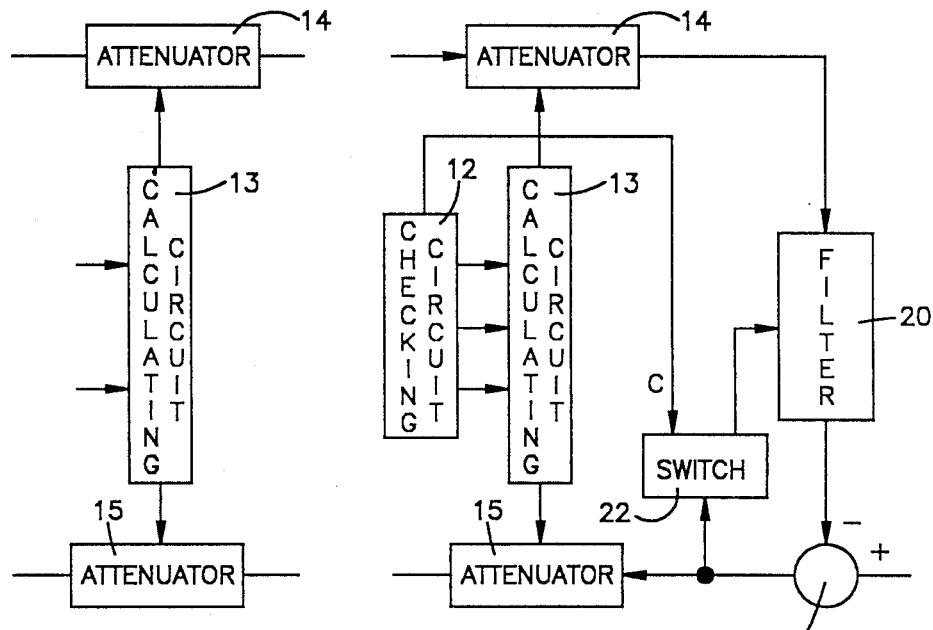

FIG. 4 another variant.

FIG. 5 another variant.

Figure 6:
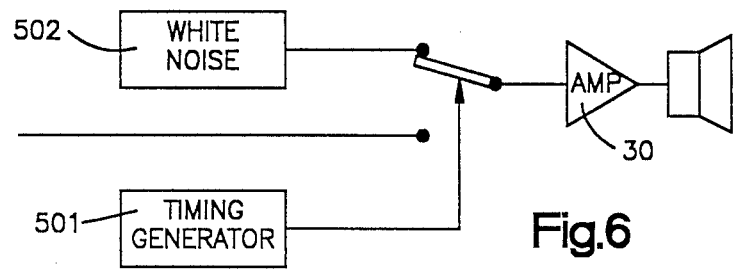

FIG. 6 another variant.

Figure 7:
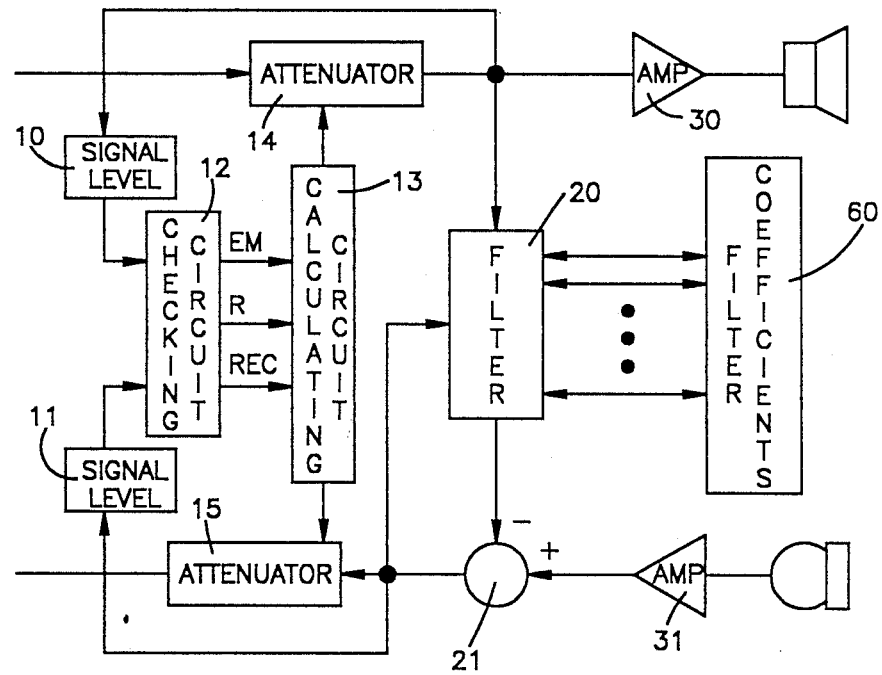

FIG. 7 another variant.

Figure 8:
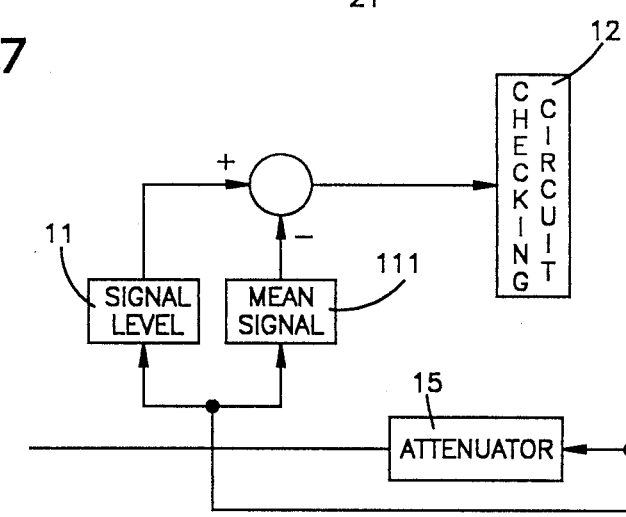

FIG. 8 another variant.

The diagram of FIG. 1 represents a four-wire system with an attenuator AHP connected to a loudspeaker HP, an attenuator AMIC connected to a microphone MIC and an echo cancellation device DAE having a filter F and a subtracter S. The attenuations introduced by the two attenuators are respectively designated AHP and AMIC. The gain of subtracter S is designated G.

In the absence of an echo cancellation device, A designates the overall attenuation (AHP+AMIC) necessary for obtaining a satisfactory efficiency in emission and reception:

AMIC=O AHP=A in emission

AMIC=A AHP=O in reception.

On adding an echo cancellation device, it is possible to lower the amplitude of the attenuation:

AMIC=O AHP=A—G in emission

AMIC=A—G AHP=O in reception.

Seeking stability for the system in all operating phases (emission and reception) leads to the taking account of the gain G obtained under the worst operating conditions, i.e. in the absence of a signal on the loudspeaker. In this case, maximum gain switching is necessary to obtain an adequate efficiency.

However, analysis of the operation of the cancellation device reveals that in the presence of signals emitted by the loudspeaker, there is a considerable increase in the gain G and g is this gain increase. The above equations become:

in emission (signal of the microphone preponderant):

AMIC=O AHP A—G at rest (no signals):

AMIC=A—G  AHP=O (it would also be possible to have):

(AMIC=(A/2)−G, AHP=A/2 for example)

All the loop attenuations are equal to A−G.
in reception (signal on loudspeaker)

AMIC=A−(G+g) AHP=O

All the loop attenuations are equal to A−(G+g).

This calculation shows that in the reception phase the attenuation to be introduced into the emission channel to retain the stability less as a result of the increase g of the gain of the echo cancellation device.

The increase of the gain g has a fixed value. It would also be possible for g to be given a value varying as a function of the parameters linked with the operation of the device.

The object of the present invention is to at all times and in particular in the reception phase to evaluate the gain (G+g) of the cancellation device, in order to only reduce the minimum attenuation (A-G-g) necessary for stability into each channel.

The evaluation of the performances of the cancellation device is obtained by detecting the state of the terminal (emission, rest, reception). This information informs the gain switch on the attenuation to be introduced into each channel.

Unlike in the prior art devices, the total attenuation introduced into the loop is variable as a function of the state of the telephone terminal.

A first embodiment of the inventive device is illustrated in FIG. 2. First circuits 10 and 11 make it possible to measure the level of the signals present respectively on the reception and emission channels and control a checking circuit 12, whose function is to define the state of the telephone set (emission, rest, reception). These informations enable a calculating circuit 13 to determine the attenuations to be introduced into each channel by variable attenuation circuits 14 and 15, so that we respectively obtain:

| on emission | AMIC=O | AHP=A−G | S(A)=A−G |
|---|---|---|---|
| at rest | AMIC=A−G | AHP=O | S(A)=A−G |
| on reception | AMIC=A−(G+g) | AHP=O | S(A)=A−(G+g) | in which S(A) represent the sum of the attenuations.

A subtracter 21 forms the difference between the signal from the microphone and the echo signal estimated by a filter 20. The residual signal from subtracter 21 is emitted to the telephone line and is used for the adaptation of the coefficients of filter 20 in accordance with a standard echo cancellation algorithm. Circuits 30 and 31 are amplifiers According to a variant of the invention shown in FIG. 3, circuits 40 and 41 are digital-analog and analog-digital converters respectively. They make it possible to realize all the gain switching and echo cancellation functions in digital form. This variant facilitates the integration of the device into an entirely digital terminal. In the case where the device is integrated into an analog set, other digital-analog and analog-digital converters 60,61 respectively make it possible to obtain the interface with a two wire/four wire differential circuit.

According to a variant of the invention shown in FIG. 4, the checking member 12 supplies to a subassembly 22 of the cancellation device an information only authorizing it to adapt its coefficients in the presence of a satisfactory signal on the reception channel. Typically, subassembly 22 is constituted by a switch, whose open or closed state is controlled by a signal from checking member 12, said signal assuming a value triggering the closure of the switch when the signal sampled on the reception channel (input of circuit 10) exceeds a predetermined threshold.

According to another variant of the invention shown in FIG. 5, circuit 13 has inputs from the outside which indicate to it the reception level desired by the user and enabling him to adjust the attenuations on each channel. The attenuation N required by the user on the reception channel is taken into account by the calculating member and subtracted on the emission channel. The attenuations become:

| | | | |
|---|---|---|---|
| in emission | AMIC=O | AHP=A−G | S(A)=A−G |
| at rest | AMIC=A−(N+G) | AHP=N | S(A)=A−G |
| in reception | AMIC=A−(N+G+g) | AHP=N | S(A)=A−(G+g) | in which N is the attenuation introduced by the user.

According to another variant of the invention shown in FIG. 6, a device 50 replaces, during the putting into operation of the device, the reception signal from the line by a white noise, in order to improve the convergence of the echo cancellation device. For this purpose, device 50 comprises a timing generator 501 fixing the emission duration of the white noise signal supplied by a generator 502.

According to another variant of the invention shown in FIG. 7, a device 60 ensures the storage of the coefficients of the filter after each use, in order to facilitate the convergence of the echo cancellation device during the next use.

According to another variant of the invention shown in FIG. 8, circuit 11 has means 111 for defining the mean level of the noise signal contained in the emission signal and for subtracting this value from the signal representing the level on said channel before its entry onto circuit 12.

We claim:

1. Device for performing the hands-free function in a telephone set comprising:
a reception channel with a first variable attenuator having a first attenuation, a control input for controlling said first attenuation, a signal output delivering a reception signal having a level, and a loudspeaker connected to said output of said first variable attenuator;
an emission channel with a microphone delivering an emission signal having a level, a second variable attenuator having a second attenuation, and a control input for controlling said second attenuation;
an echo canceller consisting of a filter having a signal said loudspeaker, a control input and an output, and a subtracter having a first input connected to said microphone and a second input connected to said output of said filter and having an output connected to said second variable attenuator, said echo canceller having a gain and said filter having adaptable coefficients;

a first circuit for measuring the level of the reception signal present on said reception channel;

a second circuit for measuring the level of the emission signal present on said emission channel;

a checking circuit having two inputs connected to said first and second circuits and having outputs, said checking circuit delivering on one of said outputs a triggering signal when the said first circuit measures a level exceeding a predetermined threshold;

a switch having a control input connected to one output of said checking circuit and receiving therethrough said triggering signal, a signal input connected at the output of said subtracter and signal output connected to said control input of said filter, said control input of said filter receiving through said switch a signal delivered by said output of said subtracter and adapting therefrom its coefficients; and a calculating circuit having inputs connected to said outputs of said checking circuit and having a first output connected to said control input of said first variable attenuator and a second output connected to said control input of said second variable attenuator, the total of said first and second attenuations of said first and second variable attenuators being equal to $(A-G)$ when said emission signal is present and when none said emission and reception signals is present, and is equal to $A-(G+g)$ when said reception signal is present, wherein $G$ is the gain of said echo canceller when said reception signal is absent and $(G+g)$ is the gain of said echo canceller when said reception signal is present, wherein A is the total of said first and second attenuations necessary for obtaining stability of the device in the absence of said echo canceller.

2. Device for performing the "hands-free" function in a telephone set according to claim 1, characterized in that it comprises a digital-analog converter and an analogdigital converter on the emission and reception channels, wherein the attenuators, the echo canceller, the first and second circuits, the checking circuit, the switch, and the calculating circuit are of the digital type.

3. Device for the performance of the "hands-free" function in a telephone set according to claim 1, characterized in that it comprises means for applying an initializing white noise signal on the reception signal.

4. Device for performing the "hands-free" function in a telephone set according to claim 1, characterized in that it comprises means for defining a mean noise level contained in the emission signal and for subtracting the mean noise level from the emission signal.

5. Device according to claim 1 further comprising:
said reception channel having a first analog-digital converter before said first variable attenuator and a first digital-analog converter between said first variable attenuator and said loudspeaker; and
said emission channel having a second analog-digital converter between said microphone and said subtracter and a second digital-analog converter after said second variable attenuator.

* * * * *

UNITED STATES PATENT AND TRADEMARK OFFICE
CERTIFICATE OF CORRECTION

PATENT NO. : 4,984,265

DATED : January 8, 1991

INVENTOR(S) : Connan et al.

It is certified that error appears in the above-identified patent and that said Letters Patent is hereby corrected as shown below:

Column 1, line 5, in the Title, delete "SUPPRESSION" and insert --CANCELLING--;

line 10, delete "Perform" and insert --perform--;

line 15, delete "Particular" and insert --particular--; and line 27, delete "FR-A-No.2 566 980" and insert --FR-A-2 566 980--.

Column 2, line 67, delete "AMIC=0 AHP A-G" and insert --AMIC=0 AHP=A-G--.

Column 3, line 16, after "stability" insert --is--.

Column 4, line 63, after "signal" insert --input connected between said first variable attenuator and--.

Signed and Sealed this

Fourteenth Day of May, 1991

Attest:

HARRY F. MANBECK, JR.

*Attesting Officer*  *Commissioner of Patents and Trademarks*